Aug. 18, 1970 — J. CREMER ET AL — 3,524,725

PROCESS FOR THE MANUFACTURE OF PHOSPHORUS SULFIDES

Original Filed Dec. 18, 1962 — 5 Sheets-Sheet 2

INVENTORS
Joseph Cremer
Friedrich Thomas
Heinz Harnisch

INVENTORS
Joseph Cremer
Friedrich Thomas
Heinz Harnisch

INVENTORS
*Joseph Cremer*
*Friedrich Thomas*
*Heinz Harnisch*

Aug. 18, 1970    J. CREMER ET AL    3,524,725
PROCESS FOR THE MANUFACTURE OF PHOSPHORUS SULFIDES
Original Filed Dec. 18, 1962                5 Sheets-Sheet 5

INVENTORS
Joseph Cremer
Friedrich Thomas
Heinz Harnisch

United States Patent Office 3,524,725
Patented Aug. 18, 1970

3,524,725
PROCESS FOR THE MANUFACTURE
OF PHOSPHORUS SULFIDES
Joseph Cremer and Friedrich Thomas, Hermulheim, near Cologne, and Heinz Harnisch, Lovenich, near Cologne, Germany, assignors to Knapsack Aktiengesellschaft, Knapsack, near Cologne, Germany, a corporation of Germany
Continuation of application Ser. No. 245,585, Dec. 18, 1962. This application Dec. 21, 1967, Ser. No. 692,609
Int. Cl. C01b 25/14
U.S. Cl. 23—206　　　　　　　　　　　　　　　　1 Claim

ABSTRACT OF THE DISCLOSURE

Phosphorus is reacted with sulfur at elevated temperatures in a reaction zone surrounded by a heat exchanging medium. By means of heating and cooling, respectively, the temperature in the reaction zone is maintained below the boiling and above the solidification point of the reaction mixture by causing a gas stream having the temperature necessary for heating and cooling, respectively, to flow around the reaction zone. The gas flow is conducted so as to permit reversing the reaction zone substantially instantaneously from heating to cooling and vice versa, with the gas stream for cooling being air suction drawn past the reaction zone, and the gas stream for heating consisting of combustion and off-gases, free from oxygen and originating from a mixture of a combustible and air.

CROSS-REFERENCE TO RELATED APPLICATION

This application is a continuation of copending application Ser. No. 245,585, filed Dec. 18, 1962, now abandoned.

BACKGROUND OF THE INVENTION

The present invention relates to a process for the manufacture of phosphorus sulfides from phosphorus and sulfur at elevated temperatures, and to an apparatus suitable for use in carrying out the present process.

Phosphorus-sulfur compounds are generally prepared by introducing the stoichiometrical amount of liquid, so-called yellow phosphorus into molten sulfur or by introducing simultaneously measured quantities of liquid sulfur and phosphorus into a finished phosphorus sulfide melt. The reaction is accompanied by strong evolution of heat.

If the heat set free is insufficiently dissipated, the reaction may proceed with the formation of temperatures so high that considerable amounts of the reaction components and/or of the reaction product itself are volatilized which involves considerable losses of material, that is to say the yields obtained are poor.

It is known that cooling can be effected indirectly with the use of an appropriate liquid or directly by using the reaction heat for the distillation of the reaction product, i.e. substantially as evaporating heat. It should, however, be borne in mind that such liquids are not easy to handle at reaction temperatures within the range of about 300 to 400° C. in vacuo and that the distillation of the phosphorus sulfides themselves represents a very expensive and difficult procedure.

Under practical conditions, it may happen, for example due to unforeseen disturbances, that the apparatus comes inevitably to a standstill. The failure of reaction heat being liberated in such cases may result in the melt becoming rapidly cooled and thereby solidified, especially when the distillation is carried out in vacuo, due to the slight difference between the boiling point and solidification range of the phosphorus sulfides, irrespective of whether cooling is effected by means of a cooling agent of high caloric capacity or by evaporation.

It is obvious that the solidifying melt may give rise, for example, to cloggings in the feed and discharge pipes or to mechanical damage to the stirring means or the stirrer gearing, and that the poor thermal conductivity of the solid phosphorus sulfides complicates the return of the reactor to operation quite considerably.

The present invention is based on the observation that the above-mentioned difficulties can be eliminated by using a gaseous cooling or heating agent or more advantageously by the combination of air-cooling and heating of the reactor with the off-gases emanating from a combustion chamber, which permits the instantaneous reversal from heating to cooling and vice versa depending on the requirements in a given case. This procedure ensures sufficient dissipation of heat during the reaction and enables the phosphorus sulfides to be maintained in the liquid state upon a sudden failure of the reaction. The cooling efficiency of the gas employed, for example air, carbon dioxide and nitorgen, can be considerably improved by admixing therewith within wide limits steam and/or finely divided mist of water. Furthermore, it is possible, for example in emergency cases, to produce both a rapid cooling effect and a substantially inert gas atmosphere in the jacket pipe in the interior of the reactor by means of Dry Ice snow.

Although it is considered old to use a jacketed reaction vessel for the manufacture of phosphorus sulfides from phosphorus and sulfur in order to thereby remove the reaction heat through a heat-exchanging medium and to control the reaction, it is here noted that all the processes customarily used for making phosphorus sulfides employ liquid and preferably inert heat exchanging material. It has not previously been suggested, however, that air should preferably be used in this particular case for the cooling of the reactor. On the contrary, the judgment of industrial chemists has prevented the art from contemplating the use of air as a coolant under these particular circumstances in order not to jeopardize the safety of operation.

It is generally known that molten phosphorus sulfides react spontaneously as does elementary phosphorus with atmospheric oxygen with the formation of flames. The penetration of air into the reaction chamber would therefore result in catastrophic consequences. This is the particular reason why air as the cheapest coolant has not previously been used in the manufacture of phosphorus sulfides. Costly liquid cooling agents, for example silicon oils were used instead, the thermal inertness and the difficult maintenance of such liquids, some of which undergo thermal decomposition on the hot reactor walls, being taken into account for better or for worse.

It has now unexpectedly been found that air can be used as a harmless cooling agent by suction-drawing it past the reactor with the resultant creation of a sub-pressure in the jacketed cooling chamber with respect to the interior of the reactor so that air cannot penetrate through a possible leak in the reactor, while, on the other hand, liquid phosphorus sulfide escaping through untight spots is immediately solidified by the air flowing past at a necessarily high velocity of flow. Solid phosphorus sulfides are not, however, auto-inflammable in the open air.

Another advantage offered by the process of the present invention over the customary methods resides in the fact that wherever unforeseen disturbances occur which lead to a standstill of the reaction, the reactor can be reversed within a very short period of time from cooling to heating without the reaction mixture being solidified due to the high temperature coefficients of the liquid cooling agents. Phosphorus sulfide which has once solidified even if partially is very difficult to re-transform into the liquid state due to its poor thermal conductivity and there is no possibility offered for avoiding local super-heatings which already involved serious accidents in industry.

This danger is eliminated in the process of the present invention which permits the apparatus to be reversed within a few seconds from heating to cooling in the case of need. To this end, it is not necessary to subject the cooling liquid to a wearisome heating operation nor is it necessary to keep a permanent stock of heated liquid, the heating being preferably carried out with the gas emanating from a combustion chamber.

For that purpose, a combustible in stock can be atomized instantaneously into a chamber, mixed therein with air, ignited and burnt, the mixture of combustible and air being advantageously regulated so as to produce combustion gases which are free from oxygen in excess. It is readily understood that such procedure is cheaper than the customary methods and not burdened with the inertness and other disadvantages of liquid systems.

According to a further embodiment of the present invention, it may be advantageous to dispose the heat inlet, i.e the gas inlet, at the lower or upper end of the reactor as the case may be in order thereby to avoid, especially in continuous operation, the susceptibility to disturbances during standstill which are difficult to avoid from a constructional point of view, for example clogging due to solidification of the melt in the discharge pipe.

The best possible ratio of volume to effective surface is obtained in a reactor of small cross-section and large length. The ratio of diameter to height in the reactor should amount, for example, to about 1:2 to 1:10. In order to increase the heat transfer the outer and inner surfaces of the reactor may be designed to have a grooved or ribbed shape.

The feed pipes for liquid sulfur and phosphorus, respectively, are extended approximately to the bottom of the vessel in order thereby to force starting material which may appear in the form of gas bubbles to travel over a prolonged distance through the melt and therewith to increase the time during which such material undergoes reaction. For continuous operation, the stirrer is so designed that its blades which are arranged in stepwise fashion only mix the melt in a horizontal direction so that the starting substances which undergo reaction in the bottom portion of of the reactor are gradually mixed at different levels as they ascend, the necessary residence time of the phosphorus sulfides in the reactor being thereby ensured and the mixing of the material in the reactor in vertical direction being avoided. Mixing in vertical direction may be of interest in a discontinuously operated reactor and may readily be achieved by means of a propeller-type design of the stirrer blades.

The siphon discharge pipe is displaceable in height to adapt it to the most favorable operating conditions prevailing in a given case. Due to its being arranged in the interior of the reactor. it need not be heated by an additional heating means. The thermocouples, which are indispensable for the control of the reaction, are advantageously disposed in such a manner that the bore holes through which the protective tubes project are always arranged in a rib elevation so as to avoid a weakening of the material (reduction of wall thickness).

Scavenging gas, for example nitrogen or carbon dioxide, is supplied at a position below the stuffing box of the stirrer shaft which substantially avoids the penetration of gaseous reaction components into the stuffing box. The reactor is equipped with a main off-gas pipe having a relatively wide cross-section and a reverse off-gas pipe having a relatively narrow cross-section which can be opened in case of emergencies. An additional means for electrically heating the two pipes to temperatures in the neighborhood of about 250 to 300° C. substantially avoids cloggings and bakings in these pipes.

Illustrative embodiments of the apparatus used in accordance with the present invention are represented in the accompanying drawings:

Referring to the drawings:

FIG. 1 represents a reactor for continuous operation in longitudinal section. In FIG. 1 the numeral 1 means the actual reactor housing consisting of a cylindrical pipe provided with cooling or heating ribs 2 which are advantageously disposed in coil-like manner in the form of a thread. The pipe tapers downwardly via the cone 3 to form a short outlet pipe which serves solely for completely discharging material from the reactor. At its top the reactor is closed by a cover 4 which bears the support 5 and the stuffing box 6 of the stirrer shaft 7. The stirrer blades are preferably designed as beams which avoid any thrust action. Below the stuffing box 6 scavenging nitrogen is so introduced through pipeline 8 that the gaseous product does not reach the stuffing box. The numerals 9 and 10 designate off-gas connections which can be heated by means of an electrical resistance heater 18. 11 and 12 are the feed pipes for the raw materials sulfur and phosphorus. The discharge pipe 13 is displaceable and extends to the outside through stuffing box 14. The height of the pipe is dimensioned so as to obtain the desired height of filling. The reactor pipe 1 and the ribs 2 are surrounded by a jacket 15 which ensures the correct flow of the cooling or heating gas. Depending on the operating conditions, the gas enters through short pipe 16 (dotted arrows) and leaves the reactor jacket through short pipe 17 or vice versa (solid arrows). The short pipes of the housing communicate with the feed lines 20 which enable further cooling agents, for example Dry Ice or steam, to be supplied. The temperature of the reaction mixture can be measured by means of thermometer 19 extended through the ribs.

FIG. 2 shows a reactor with the jacket 15 in longitudinal section, but the actual reactor is shown in elevation. The cooling ribs 2 form a multiple thread.

FIG. 3 shows the same reactor as FIG. 1, but for discontinuous operation. The stirrer 7 has propeller blades which, contrary to the arrangement shown in FIG. 1, may impart a thrust movement to the mixture. The discharge pipe 13 is extended entirely downward.

FIG. 4 shows a cross-section along the line IV–IV of FIG. 1 through the reactor with a smooth inner wall at the height of connection 16. The cooling or heating gas enters, as indicated by the arrows, into the threads of ribs 2. An octuple thread is shown.

1 is the reactor
21 is a heating chamber for generating the necessary heating gas
22 is the change over slide for the heating gas
23 is a rotary slide valve for switching to upper or lower gas input
24 is a fan for drawing off the heating and cooling gases.

Figure 6:
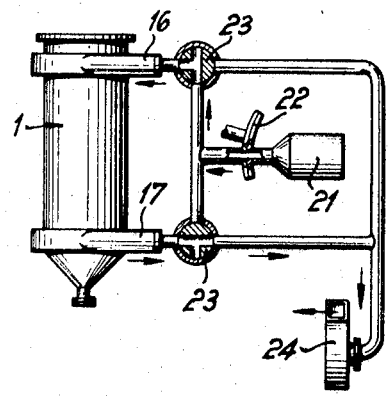
FIGS. 6 to 9 show the different possibilities of connection for the cooling and heating of the reactor.

FIG. 6 shows the circuit for reactor heating from connection 16.

Figure 7:
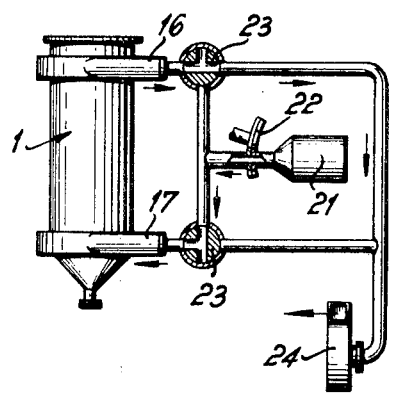

FIG. 7 shows the circuit for reactor heating from connection 17.

Figure 8:
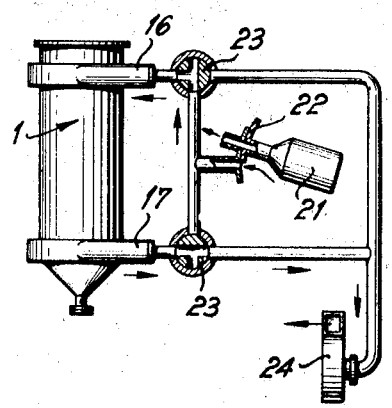

FIG. 8 shows how the reactor is cooled from above through connection 16. The heating chamber 21 is swung out so that cooling gas can be blown in at this point.

Figure 9:
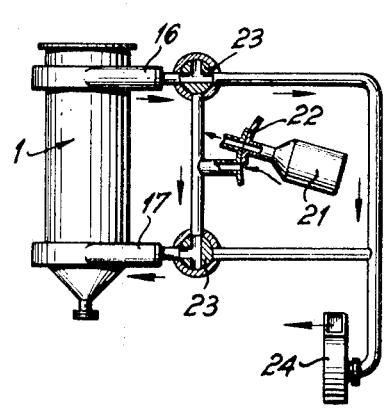

FIG. 9 shows how the reactor is cooled, this time from connection 17.

The coil-like arrangement of the cooling ribs, especially when they extend to the inner wall of the jacket, and the particular manner in which the gas current flowing around the reactor is conducted ensure that an especially good and uniform cooling or heating effect is obtained. The rapid reversal from cooling to heating can be effected in simple manner, for example by actuation of slide valves or automatically as the case may be.

The apparatus described above can be used for making phosphorus sulfides and in addition thereto for carrying out other chemical reactions, preferably those which are exothermal and the reaction products of which have a relatively high solidification point.

The present invention for making phosphorus sulfides from phosphorus and sulfur at elevated temperatures and, if desired, under the atmosphere of an inert gas in a reaction zone surrounded by a heat exchanging material which receives and controls the reaction heat is more especially carried out as follows: a gas stream consisting, for example, of air, carbon dioxide or nitrogen and having the temperature necessary for cooling or heating is caused to flow around the reaction zone, the reaction zone being maintained by cooling or heating at a temperature below the boiling point and above the solidification point of the reaction mixture used. The reaction zone is preferably cooled with a current of air and heated by means of the combustion or off-gases produced by a mixture of a combustible and air. The gases used as the heat exchanging material are so supplied that the reaction zone can be reversed within a very short time from heating to cooling or vice versa. The mixture of the combustible and air should be composed so that the combustion gases issued are free from free oxygen.

According to a particular embodiment of the present invention, the gases used as the heat exchanging material are suction-drawn past the walls of the reaction zone, the heat exchanging gases being thereby maintained under a sub-pressure with respect to the pressure prevailinig in the reaction zone. The current of gas flowing around the reaction zone may be supplied at a position in the lower portion of the reaction zone and discharged at a position in the upper portion of the reaction zone or vice versa. Depending on the effect to be produced, the gas current may be admixed with steam and/or mist of water and may also be admixed with carbon dioxide, for example in the form of Dry Ice snow.

The apparatus used in the present process for making phosphorus sulfides comprises a reaction 1, ribs 2, which are advantageously disposed at the outer wall of the reactor in coil-like manner, a jacket 15 surrounding the reactor, a connection 16 and a connection 17 which are both supported by the jacket, supply lines 11 and 12, gas discharge pipes 9 and 10, a stirring means 7, a cover 4, and a stuffing box 6, the stirring means projecting through said stuffing box 6 and said cover 4, and optionally a discharge pipe 13 disposed so as to be displaceable in height.

Figure 1:
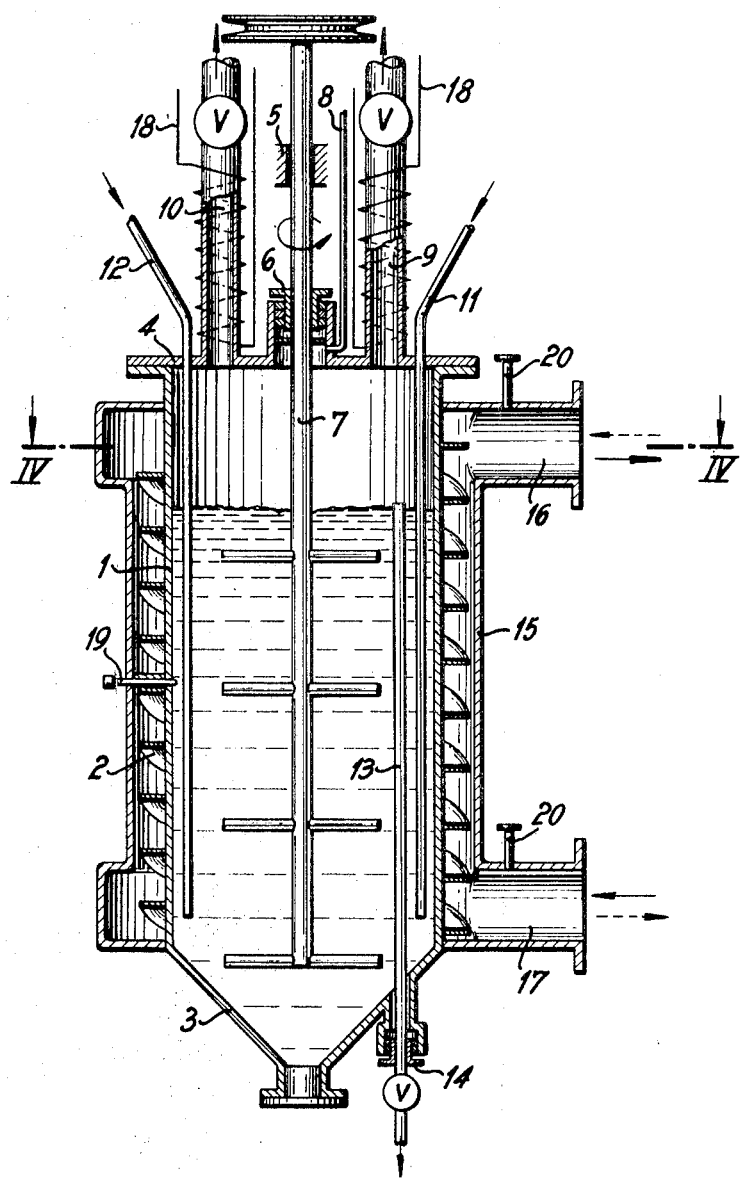
Figure 2:
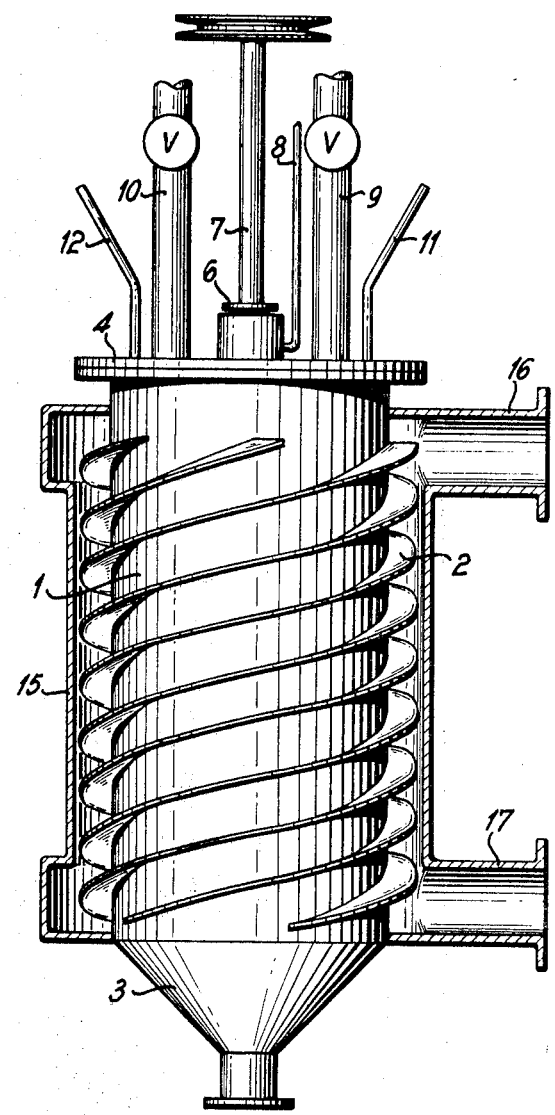
Figure 3:
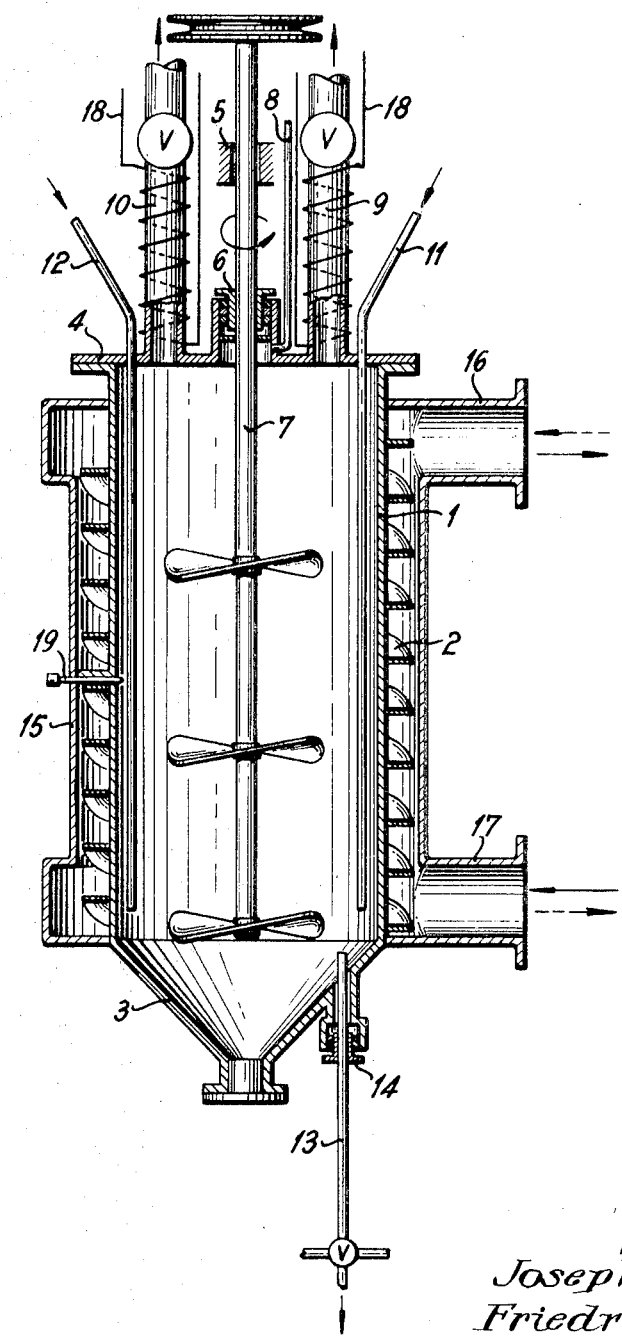
Figure 5:
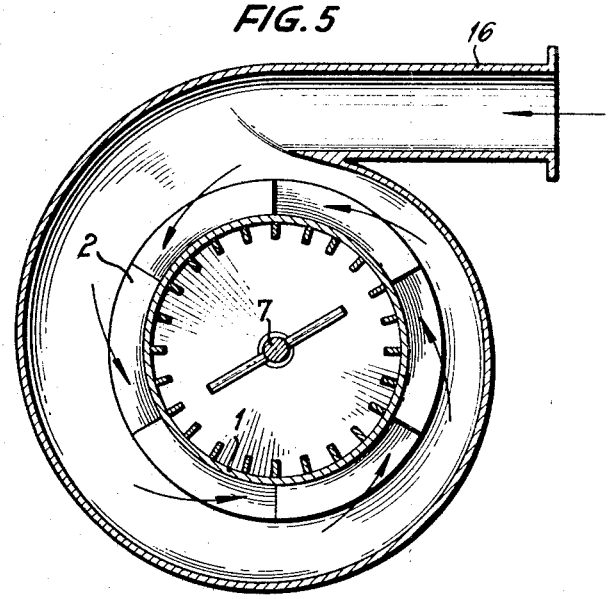
FIG. 5 shows the same cross-section as FIG. 4, but the reactor pipe 1 is provided with longitudinal ribs on its inner wall which increase the heat exchanging surface.

The apparatus is more especially designed as follows: The ratio of the diameter to the height of the reactor corresponds to about 1:2 to 1:10. The inner wall of the reactor carries, for example ribs which are advantageously disposed in longitudinal direction (FIG. 5). For the continuous manufacture of phosphorus sulfides it is advantageous to use a beam-type agitator as the stirring means, while for the discontinuous manufacture of phosphorus sulfides it is preferred to use a propeller-type agitator as the stirring means (FIG. 3). The reactor vessel is provided with thermocouples 19 extended through bore holes in ribs 2. Below the stuffing box 6 a pipe 8 projecting into the reactor is disposed through which inert scavenging gas is supplied. The ribs 2 may be dimensioned so as to extend to the jacket wall 15 whereby the flow of the heating and/or cooling gas is improved.

Figure 4:
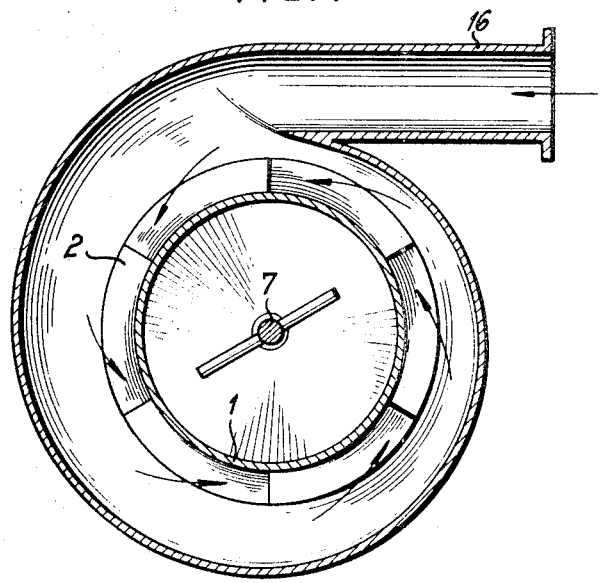

In an advantageous embodiment of the present apparatus the ribs 2 have the same shape of a multiple thread (FIG. 4). The jacket connections 16 and 17 each carry a sliding valve 23 and communicate via a reversing slide valve 22 with combustion chamber 21 and also communicate with fan 24 (FIGS. 6–9).

What is claimed is:

1. In the process for the manufacture of phosphorus sulfides by reacting phosphorus with sulfur at elevated temperatures in a reaction zone surrounded by a heat exchanging material which receives and controls the reaction heat, the improvement which comprises maintaining in the reaction zone by heating and cooling, respectively, a temperature below the boiling and above the solidification point of the reaction mixture by causing a gas stream having the temperature necessary for heating and cooling, respectively, to flow around the reaction zone, conducting the gas stream so as to permit reversing the reaction zone substantially instantaneously from heating to cooling and vice versa, the gas stream for cooling consisting of air being suction drawn past the reaction zone to create a sub-pressure with respect to the interior of the reaction zone for preventing the gas from penetrating the reaction zone whereby any liquid phosphorus sulfide escaping from the reaction zone is immediately solidified in the presence of the gas stream flowing around the reaction zone at a high velocity of flow, and the gas stream for heating consisting of combustion and off-gases, being free from oxygen and originating from a mixture of a combustible and air.

References Cited

UNITED STATES PATENTS

| | | | |
|---|---|---|---|
| 1,558,897 | 10/1925 | Lea et al. | 23—1 |
| 2,007,510 | 7/1935 | Thornton. | |
| 2,569,128 | 9/1951 | Jones | 23—206 |
| 2,670,272 | 2/1954 | Nutting. | |

OSCAR R. VERTIZ, Primary Examiner

C. B. RODMAN, Assistant Examiner

U.S. Cl. X.R.

23—1, 285